US009485344B2

(12) United States Patent
Mahasenan et al.

(10) Patent No.: US 9,485,344 B2
(45) Date of Patent: Nov. 1, 2016

(54) PERSONALIZING INTERACTION WITH A STRUCTURE

(71) Applicant: Honeywell International Inc., Morristown, NJ (US)

(72) Inventors: Arun Vijayakumari Mahasenan, Trivandrum (IN); Amit Kulkarni, Plymouth, MN (US); Patrick Gonia, Maplewood, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/556,919

(22) Filed: Dec. 1, 2014

(65) Prior Publication Data

US 2016/0156764 A1 Jun. 2, 2016

(51) Int. Cl.
| | |
|---|---|
| *H04W 24/00* | (2009.01) |
| *H04M 1/725* | (2006.01) |
| *H04W 4/04* | (2009.01) |
| *F24F 11/00* | (2006.01) |
| *G05B 15/02* | (2006.01) |

(52) U.S. Cl.
CPC ...... *H04M 1/72533* (2013.01); *F24F 11/0009* (2013.01); *G05B 15/02* (2013.01); *H04W 4/04* (2013.01)

(58) Field of Classification Search
CPC ............... H04M 1/72533; H04W 4/04; F24F 11/0009; G05B 15/02
USPC ............... 455/456.1, 456.5; 236/51; 700/278
See application file for complete search history.

(56) References Cited

U.S. PATENT DOCUMENTS

| | | | |
|---|---|---|---|
| 2003/0073412 A1 | 4/2003 | Meade | |
| 2009/0065596 A1* | 3/2009 | Seem ................... | F24F 11/0009 236/51 |
| 2010/0289643 A1* | 11/2010 | Trundle ............... | F24F 11/0086 340/545.1 |
| 2011/0196547 A1 | 8/2011 | Park et al. | |
| 2011/0218650 A1* | 9/2011 | Crucs .................... | G05B 11/01 700/13 |
| 2012/0031984 A1* | 2/2012 | Feldmeier ............. | F24F 11/001 236/49.3 |
| 2013/0113655 A1* | 5/2013 | Shen ...................... | G01S 19/42 342/357.31 |
| 2013/0113993 A1 | 5/2013 | Dagit, III | |
| 2013/0347023 A1* | 12/2013 | Brandwijk ......... | H04N 21/4751 725/25 |
| 2014/0070919 A1 | 3/2014 | Jackson et al. | |

(Continued)

FOREIGN PATENT DOCUMENTS

| | | |
|---|---|---|
| AU | 2013100081 | 3/2013 |
| WO | 2011001320 A1 | 1/2011 |

OTHER PUBLICATIONS

Mike Elgan. "Why I Want Apple's iBeacon at Home." Cult of Mac. Dec. 7, 2013. Retrieved from: http://www.cultofmac.com/257248/why-i-want-apples-ibeacon-at-home/.

(Continued)

*Primary Examiner* — Khai M Nguyen

(74) *Attorney, Agent, or Firm* — Brooks, Cameron & Huebsch, PLLC

(57) ABSTRACT

Methods, devices, and systems for personalizing interaction with a structure are described herein. One method includes determining a comfort preference associated with a user of a mobile device corresponding to a particular location with respect to a structure, storing the comfort preference in a memory, and modifying an operation of at least one device in the structure to provide the comfort preference responsive to a distance between the mobile device and the particular location being less than a particular threshold.

10 Claims, 2 Drawing Sheets

(56) References Cited

U.S. PATENT DOCUMENTS

| | | | | |
|---|---|---|---|---|
| 2014/0250245 A1* | 9/2014 | Pahud | ............ | G06F 13/102 710/14 |
| 2015/0247646 A1* | 9/2015 | Song | ............ | F24F 11/006 700/276 |

OTHER PUBLICATIONS

Mary-Ann Russon. "Oort: Remotely Control All Devices in Your Home Using Low-Energy Bluetooth Beacons." International Business Times. Jul. 9, 2014. Retrieved from: http://www.ibtimes.co.uk/oort-remotely-control-all-devices-your-home-using-low-energy-bluetooth-beacons-1456014.

Kang Bing, et al. "Design of an Internet of Things-based smart home system." 2nd International Conference on Intelligent Control and Information Processing (ICICIP), Jul. 25-28, 2011 (vol. 2 , pp. 921-924).

Dong Yang, et al. "Wireless Coexistence between IEEE 802.11- and IEEE 802.15.4-Based Networks: A Survey," International Journal of Distributed Sensor Networks, vol. 2011, Article ID 912152, 17 pages, 2011. doi:10.1155/2011/912152.

Extended Search Report from related European Patent Application No. 15195746, dated Apr. 20, 2016, 6 pp.

\* cited by examiner

PERSONALIZING INTERACTION WITH A STRUCTURE

TECHNICAL FIELD

The present disclosure relates to methods, devices, and systems for personalizing interaction with a structure.

BACKGROUND

Structures (e.g., homes, hotels, motels, office buildings, etc.) contain devices designed to provide comfortable living conditions. Such devices can, for example, provide security and/or control temperature, lighting, ventilation, and/or humidity, among others. A person's interaction with (or comfort within) a structure can include interaction with these devices.

Some previous approaches to personalizing interaction with a structure seek to enhance user interaction by automating the structure and/or devices within the structure. Using previous approaches, a person may need to physically interact with sensors, controllers, actuators, and/or other devices. Alternatively, previous approaches may employ custom-built hardware which may be costly to manufacture and/or install.

DETAILED DESCRIPTION

Figure 1:
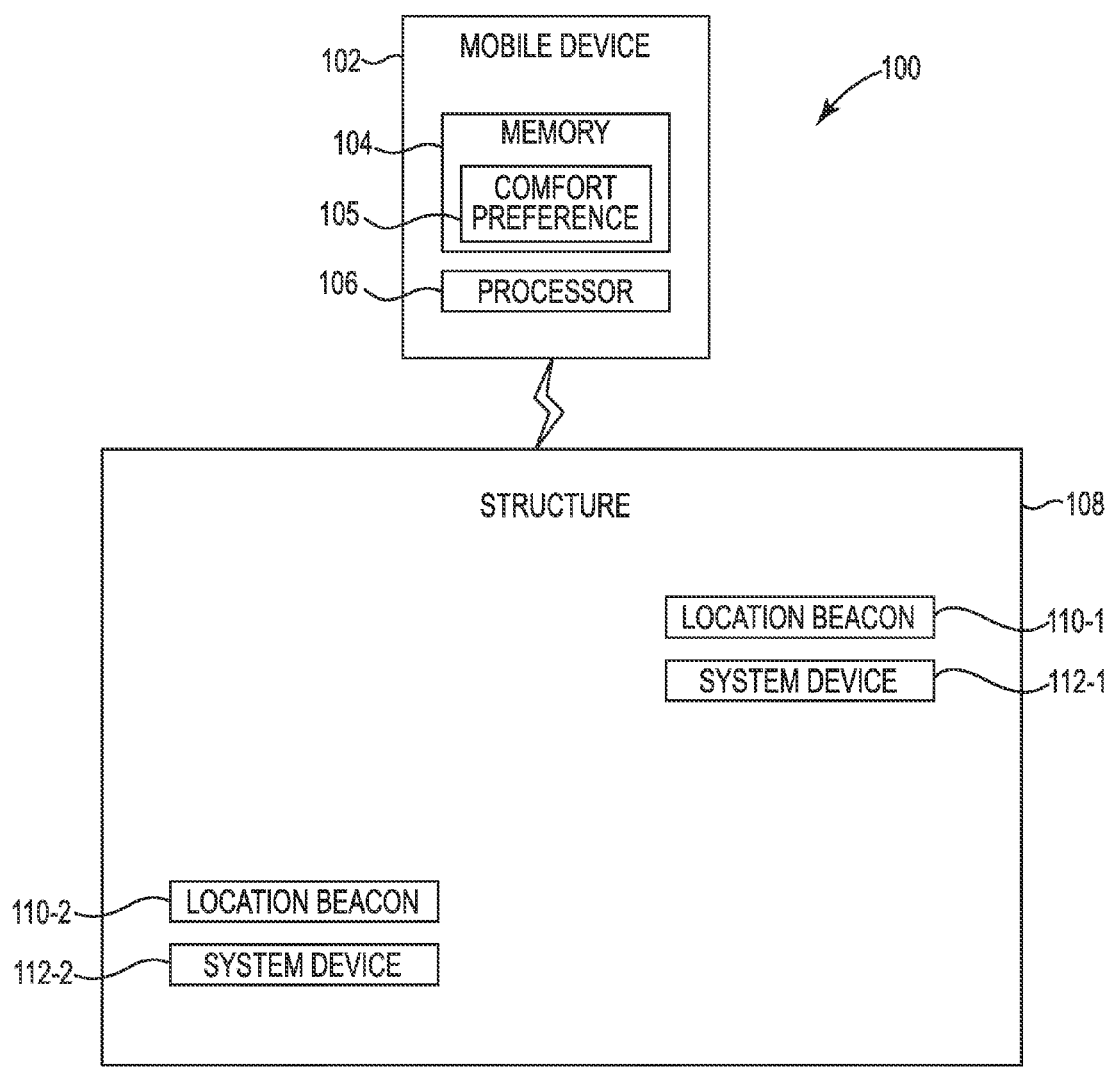
FIG. 1 illustrates a system for personalizing interaction with a structure in accordance with one or more embodiments of the present disclosure.

Methods, devices, and systems for personalizing user interaction with a structure are described herein. For example, one or more embodiments include determining a comfort preference associated with a user of a mobile device corresponding to a particular location with respect to a structure, storing the comfort preference in a memory, and modifying an operation of at least one device in the structure to provide the comfort preference responsive to a distance between the mobile device and the particular location being less than a particular threshold.

Interaction personalization in accordance with one or more embodiments of the present disclosure can include allowing a device associated with a user to interact with (e.g., modify one or more operations of) system devices in a structure rather than the user having to interact with the system devices. Devices associated with a user, as referred to herein, includes devices that are (or can be) carried and/or worn by the user. That is, interaction personalization in accordance with one or more embodiments of the present disclosure can be implemented by the use of a carried and/or worn mobile device, such as a smart phone or wristband (e.g., watch). Accordingly, embodiments of the present disclosure can be fully automated and implemented without any burden or change in behavior of the user.

As referred to herein, "system devices" include "smart" devices, devices of a Building Management System and/or devices capable of joining a system or network. For example, system devices can include sensors, controllers, actuators, gateways, lights, heating, ventilation and air conditioning (HVAC) system devices, water system devices, alarms, security devices, thermostats, shading devices, communication devices, appliances, etc.

A person may have personal preferences associated with comfort in different locations (sometimes referred to as rooms) of a structure. Such preferences may depend, for instance, on the type of room. For example, a person may prefer a temperature to be set to 69 degrees Fahrenheit if they are in a living room (e.g., watching television) or 73 degrees Fahrenheit if they are in a bathroom (e.g., exiting a shower). In some embodiments, wireless connection(s) can be established between the device and location beacons dispersed throughout the structure in order to determine the device's location within the structure. In other embodiments, the device's location can be determined using other location functionality (e.g., WiFi, GPS, etc.), for instance.

Preferences may also depend on time context (e.g., a time of day, a day of week, a time of year, etc.). For example, a person may prefer different lighting conditions inside during summer months in the afternoon than in winter months.

Embodiments of the present disclosure can determine these preferences, store them in memory, and use them to provide a comfort setting when the user is in a particular location in a structure at a particular time. In some embodiments, the preferences can be determined based on tracking (e.g., learning) behavior of the user over a period of time. Tracking can include tracking user (e.g., device) location in conjunction with user interaction(s) with system devices in the structure. Additionally, preferences can be determined directly through user input (e.g., into the mobile device).

Providing comfort settings can include modifying (e.g., changing) an operation, state, and/or mode of a system device. For example, modification can include activating or deactivating a device, adjusting a device, alternating between device modes, etc.

Embodiments of the present disclosure can store preferences associated with a plurality of users. It is to be understood that each user may find comfort with a unique set of comfort settings. In instances where multiple users may share a location, embodiments of the present disclosure can allow for hybridizing (e.g., compromising) their comfort settings and/or prioritizing one user's comfort over another.

Some embodiments can run as a background service on the device and can establish wireless connections between the device and location beacons within a structure in order to determine the device's location within the structure. In other embodiments, the device's location can be determined using a location functionality associated with the mobile device (e.g., WiFi, GPS, etc.), for instance. Accordingly, personalized interactions with system devices can be made by the mobile device specifically tailored to the comfort preferences of the user of the device.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of blocks" can refer to one or more blocks.

FIG. 1 illustrates a system 100 for personalizing interaction with a structure 108 in accordance with one or more embodiments of the present disclosure. As shown in FIG. 1, system 100 includes a mobile device 102 and a structure 108. The mobile device 102 can be a phone (e.g., a smart phone), a tablet, a personal digital assistant (PDA), a wrist-worn device, among other types of computing devices.

As shown in FIG. 1, mobile device 102 includes a memory 104 and a processor 106 coupled to memory 104. Memory 104 can be any type of storage medium that can be accessed by processor 106 to perform various examples of the present disclosure. For example, memory 104 can be a non-transitory computer readable medium having computer readable instructions (e.g., computer program instructions) stored thereon that are executable by processor 106 to personalize interaction with the structure 108 in accordance with one or more embodiments of the present disclosure. The computer readable instructions can be and/or be a portion of an application (e.g., a mobile application) which may be downloadable over the internet, for instance.

Memory 104 can be volatile or nonvolatile memory. Memory 104 can also be removable (e.g., portable) memory, or non-removable (e.g., internal) memory. For example, memory 104 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 104 is illustrated as being located in mobile device 102, embodiments of the present disclosure are not so limited. For example, memory 104 can also be located internal to another computing resource (e.g., enabling computer readable instructions to be downloaded over the Internet or another wired or wireless connection).

As shown in FIG. 1, the memory 104 can include a comfort preference 105 (discussed further below). Although one comfort preference is shown, embodiments of the present disclosure can include a plurality of comfort preferences.

The structure 108 can be a home, a hotel, a motel, and/or an office building, among other types of structures. Although one structure is shown, embodiments of the present disclosure can include a plurality of structures.

The structure 108 can include a location beacon 110-1 and a location beacon 110-2 (sometimes generally referred to as "location beacons 110"). Although two location beacons are shown, embodiments of the present disclosure can include more or fewer location beacons. The location beacons 110 can be transmitters configured to wirelessly connect with the mobile device 102 such as Bluetooth low energy (BLE) beacons, for instance, though embodiments of the present disclosure are not so limited. For instance, the location beacons 110 can be WiFi beacons and/or femtocells, among other beacons. The location beacons 110 can be coin cell devices, USB sticks, dongles, and/or other form factors. The location beacons 110 can be a portion of an indoor proximity system, for instance. Each of the location beacons 110 can be located at a respective location (e.g., position) in the structure 108.

The location beacons 110 can allow mobile device 102 to determine its location (e.g., position) within the structure 108. The location beacons 110 can be used to determine a particular room of the structure 108 the mobile device 102 is in based on a wireless connection between the mobile device 102 and at least one location beacon 110 within the structure 108. Where "room" is used in examples discussed herein, it is to be understood that other areas are included. For example, a user can define a custom polygon in the structure 112 and the location beacons can determine when a user has entered the polygon.

For example, the location beacons 110 can each transmit a universally unique identifier recognized by the mobile device 102. When the mobile device 102 receives a transmission from one or more of location beacons 110, it can determine the distance from the location beacon(s) 110. In some embodiments, the mobile device 102 can triangulate, trilaterate and/or multilaterate its location using a plurality of the location beacons 110. The mobile device 102 can determine when a user associated with (e.g., carrying) the mobile device has entered, exited, or lingered in a location (e.g., a room of the structure 108).

For the purposes of illustration, an example is discussed herein where location beacon 110-1 is located in a first room of the structure 108 and location beacon 110-2 is located in a second room of the structure 108. It is to be understood that embodiments of the present disclosure are not limited to such a scenario.

The structure 108 can include a system device 112-1 and a system device 112-2 (sometimes generally referred to as "system devices 112"). Although two system devices are shown, embodiments of the present disclosure can include more or fewer system devices. As previously discussed, system devices 112 can include "smart" devices, devices of a Building Management System associated with the structure 108 and/or devices capable of joining a system or network. For example, system devices can include sensors, controllers, lights, heating, ventilation and air conditioning (HVAC) system devices, water system devices, alarms, security devices, thermostats, shading devices, communication devices, appliances, etc.

For the purposes of illustration, and according to the example previously discussed, system device 112-1 is discussed as being located in the first room of the structure 108 (e.g., the same room as the location beacon 110-1) and system device 112-2 is located in the second room of the structure 108 (e.g., the same room as the location beacon 110-2). It is to be understood that embodiments of the present disclosure are not limited to such a scenario.

As previously discussed, embodiments of the present disclosure can track movements of the mobile device 102 (and by extension, the user associated with mobile device 102) throughout the structure 108. In order to determine and/or learn comfort preferences (e.g., one or more settings of one or more system devices 112) some embodiments can correlate user interactions with system devices 112 with determined locations and/or movements as well as their time(s) (e.g., time context(s)). In an example, it can be determined that the user typically turns the lights off in the living room as he leaves it on weeknights after 9:00 pm.

Such tracking can be carried out over a plurality of system devices 112 over a period of time (e.g., a week, a month, a season, a year, etc.). In some embodiments the user can be prompted, via the mobile device 102, to input and/or select a comfort preference 105 responsive to the user's distance from one or more location beacons 110 being less than a particular threshold. Being less than such a threshold can include the user entering a room and/or zone associated with a particular location beacon (e.g., location beacon 110-1) and/or coming within a particular distance of the location beacon. In some embodiments, being less than the threshold can include the user coming within a particular distance of the structure 108. Coming within a particular instance can include the user entering a particular region and/or bounded geometry, for instance.

In an example, the user can define a comfort preference 105 for "wake up time" (e.g., between 6:00 am and 7:00 am) where the preference includes the lights being turned off, ventilation being on, temperature at 80 degrees Fahrenheit, security system disarmed.

Additionally, comfort preferences can be determined based on local weather conditions affecting the structure 108. Accordingly, embodiments of the present disclosure can be in communication with various weather services and/or sources of local weather conditions. In an example, a comfort preference 105 associated with a period of inclement weather and/or cloud cover (e.g., blinds open) may differ from another comfort preference 105 associated with a sunny day (e.g., blinds closed).

Once determined, comfort preferences can be stored in the memory 104 for subsequent access and/or retrieval. The comfort preferences can be stored in association with the user and/or the mobile device (e.g., via a device identifier). Embodiments of the present disclosure can retrieve a particular comfort preference 105 and provide the comfort preference(s) 105 when the user is in a particular location in the structure and/or at a particular time. That is, embodiments can access a predefined comfort preference 105, stored in the memory 104, associated with a user of the mobile device 102 based on the particular room and the time context. Some embodiments can run as a background service on the mobile device 102 and can establish wireless connections between the mobile device 102 device and location beacons 110.

To provide comfort preferences, embodiments of the present disclosure can modify an operation of at least one of the system devices 112 in the structure 108 (e.g., while the device is in the room). In other words, embodiments can change a state of the system devices 112 associated with the room from a first state to a second state. For example, modification can include activating or deactivating any of system devices 112, adjusting (e.g., adjusting power, output, speed, etc.) any of system devices 112, alternating between modes, such as energy efficiency mode (e.g., off) and/or comfort mode (e.g., on) of any of system devices 112, etc.

The alternation between an energy efficient mode and a comfort mode can be carried out responsive to occupancy determinations within the structure 112, for instance. In an example, when no occupants are detected within the structure 112, embodiments of the present disclosure can default to an energy efficiency mode and switch to a comfort mode when occupancy is detected (e.g., a user enters).

Such modification can be responsive to a distance between the mobile device and the particular location being less than a particular threshold (as previously discussed). Additionally, such modification can be responsive to a particular time (e.g., time of day, day of week, month, season, etc.). In some embodiments, the user may be prompted, via the mobile device 102, for permission to modify an operation of at least one of the system devices 112 of the structure 108. An example of such a prompt may include the text "would you like to activate the security system?" and a way to indicate "yes" or "no."

As previously discussed, comfort preferences can be stored for each of a plurality of users as each of the users may prefer different settings of the system devices 112. In instances where multiple users may share a location (e.g., a structure, a zone, and/or a room), embodiments of the present disclosure can determine a comfort preference 105 based on a priority arrangement between the devices associated with the users. Some embodiments can allow for hybridizing (e.g., compromising) their comfort settings; some embodiments can allow for prioritizing one user's comfort over another.

For example, if two users are sharing a room where one user prefers a first temperature setting and the other user prefers a second temperature setting, some embodiments may modify one or more of the system devices 112 to provide a third temperature setting that falls between the first and second temperature settings. Given the same set of circumstances, some embodiments may grant priority to one of the two users and modify one or more of the system devices 112 to provide the temperature setting preferred by that user. Priorities may be determined, set, and/or modified by a user having appropriate privileges (e.g., an owner and/or administrator of the structure 108), for instance.

In some embodiments, other means of determining a location of the mobile device 102 can be utilized in lieu of, or in addition to, the use of location beacons 110. For example, the location can be determined using location functionalities utilizing WiFi signals, GPS satellites, cellular towers, and/or others.

In some embodiments, once determined and/or stored in memory, comfort preferences can be utilized for other purposes. For example, some embodiments may provide a recommendation associated with increasing efficient usage of energy in the structure 108 (e.g., reducing energy usage) by modifying a comfort preference 105 (e.g., increasing a temperature set point of a thermostat by one degree during the summer). The recommendation can include a potential monetary savings resulting from the modification. Accordingly, mobile devices in accordance with embodiments of the present disclosure can be in communication with various power providers and/or sources of local power cost information.

Additionally, some embodiments can provide a notification responsive to a deviation from a tracked and/or learned behavior (e.g., deviation from a historical relationship between the particular room of a structure 108 the mobile device 102 is in and the time context). In one example, a notification can be provided if the user typically wakes up by a certain time but has not woken up by that time on a particular day. Such a notification can be provided to the mobile device 102 and/or to an additional device (e.g., a mobile device associated with a contact of the user).

Comfort preferences stored in the memory can be accessed and/or retrieved by a plurality of structures and/or devices of a plurality of structures. In an example, a user determines a comfort preference 105 associated with a temperature in a hotel room. Embodiments of the present disclosure can retrieve and provide that comfort preference 105 in the event that the user stays in a different hotel (e.g., a different branch of a hotel chain). Accordingly, the user's comfort may be automatically maintained across various structures according to his preferences.

Figure 2:
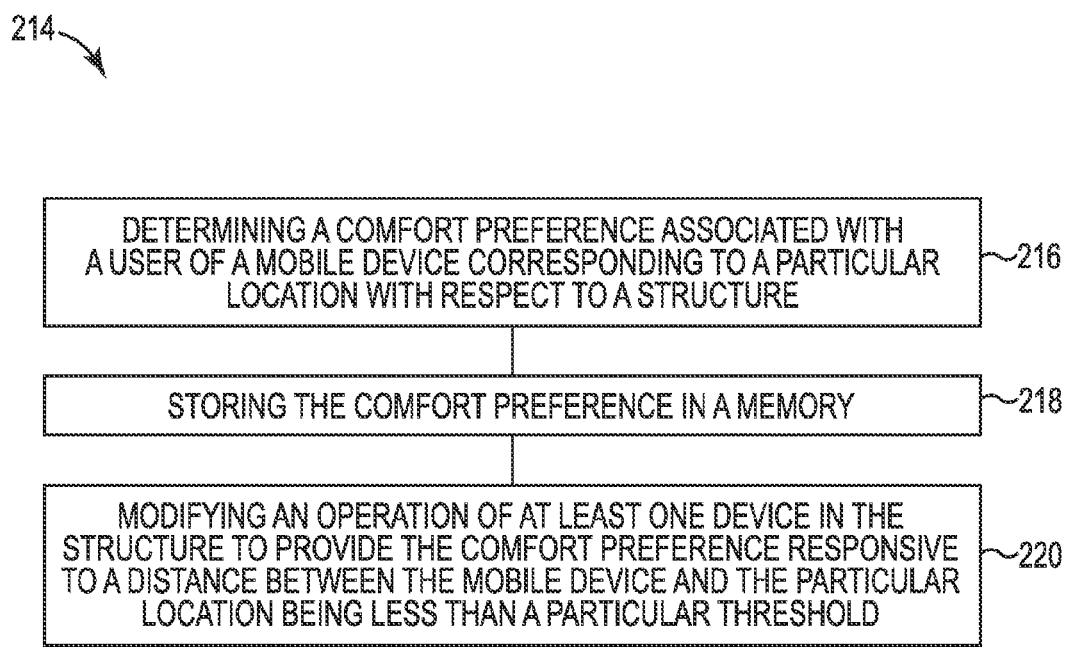
FIG. 2 illustrates a method for personalizing interaction with a structure in accordance with one or more embodiments of the present disclosure.

FIG. 2 illustrates a method 214 personalizing interaction with a structure in accordance with one or more embodiments of the present disclosure. Method 214 may be performed by a mobile device (e.g., mobile device 102, previously described in connection with FIG. 1).

At block 216, method 214 includes determining a comfort preference associated with a user of a mobile device corresponding to a particular location with respect to a structure. In some embodiments, a comfort preference can be determined based on tracking movements of the mobile device (and by extension, the user associated with the mobile device) throughout the structure. In order to determine and/or learn comfort preferences (e.g., one or more settings of one or more system devices) some embodiments can correlate user interactions with the devices with determined locations and/or movements as well as their time(s). That is, method 214 can include determining the comfort preference based on at least one adjustment made to the at least one device over a particular period of time. In some embodiments the user can be prompted, via the mobile device, to input and/or select a particular comfort preference.

At block 218, method 214 includes storing the comfort preference in a memory. Storing comfort preferences in the memory can allow subsequent retrieval of the comfort preferences. Embodiments of the present disclosure can retrieve a particular comfort preference and provide the comfort preferences when the user is in a particular location in the structure and/or at a particular time.

At block 220, method 214 includes modifying an operation of at least one device in the structure to provide the comfort preference responsive to a distance between the mobile device and the particular location being less than a particular threshold. As previously discussed, modification can include activating or deactivating devices, adjusting (e.g., adjusting power, output, speed, etc.) devices, alternating between modes, such as energy efficiency mode (e.g., off) and/or comfort mode (e.g., on) of devices, etc. With respect to an example discussed in connection with FIG. 1, some embodiments can change the state of the system device from the second state (e.g., on) to the first state (e.g., off) responsive to a determination that the device is no longer in the room (e.g., the device has moved from the first room to the second room).

Providing the comfort preference can include modifying operations of one or more devices in an effort to provide the comfort preference. For example, if a user desires a room to be set to 69 degrees Fahrenheit but has left a door open during a cold winter night, system devices may be physically unable to provide the comfort preference because of the circumstances and/or limitations of system devices (e.g., a furnace may be unable to produce enough warm air to counteract the cold air entering through the open door). In such examples, providing the comfort preference can include the modification of operations of one or more devices despite the difficulty or unlikelihood of attaining the comfort preference due to various external circumstances.

In some embodiments, method 214 can include determining, by the mobile device, a status of the provision of the comfort preference. That is, the user can be shown device(s) that may have been activated and/or deactivated in order to provide the comfort preference. The user can be shown a time (e.g., estimated time) until and/or when the comfort preference will be provided. In some embodiments, the mobile device can communicate with various system devices to make such a determination. In some embodiments, the mobile device by include one or more sensing devices that can determine the status of the provision of the comfort preference.

Determining whether the distance between the mobile device and the particular location is less than the particular threshold can include determining a distance between the mobile device and at least one location beacon associated with the structure. The distance between the mobile device and the particular location being less than the particular threshold can include the mobile device being determined to be located in the particular room, for instance. The distance between the mobile device and the particular location being less than the particular threshold can include the mobile device being determined to be within a particular distance from the structure or within a particular region in (or outside of) the structure, for instance.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for personalizing interaction with a structure, comprising:
    determining a comfort preference associated with a user of a mobile device corresponding to a particular location with respect to a structure based on at least one user adjustment made to at least one system device of the structure during a user interaction with the at least one system device;
    storing the comfort preference in a memory; and
    modifying an operation of the at least one system device in the structure to provide the comfort preference responsive to a distance between the mobile device and the particular location being less than a particular threshold.

2. The method of claim 1, wherein the method includes allowing a user associated with the mobile device to input the comfort preference into the mobile device.

3. The method of claim 1, wherein the method includes determining the comfort preference based on a time of day.

4. The method of claim 1, wherein the method includes determining the comfort preference based on the at least one adjustment made to the at least one device over a particular period of time.

5. The method of claim 1, wherein the method includes determining the comfort preference corresponding to a particular room of the structure.

6. The method of claim 5, wherein the distance between the mobile device and the particular location being less than the particular threshold includes the mobile device being determined to be located in the particular room.

7. The method of claim 1, wherein the distance between the mobile device and the particular location being less than the particular threshold includes the mobile device being determined to be within a particular distance from the structure.

8. The method of claim 7, wherein the method includes determining the distance between the mobile device and the particular location using a location functionality associated with the mobile device.

9. The method of claim 1, wherein determining whether the distance between the mobile device and the particular location is less than the particular threshold includes determining a distance between the mobile device and at least one location beacon associated with the structure.

10. The method of claim 1, wherein the method includes determining, by the mobile device, a status of the provision of the comfort preference.

\* \* \* \* \*